United States Patent
Finlayson et al.

(12) 
(10) Patent No.: US 9,968,821 B2
(45) Date of Patent: May 15, 2018

(54) BUSHING IN AN EXERCISE MACHINE

(71) Applicant: ICON Health & Fitness, Inc., Logan, UT (US)

(72) Inventors: Kurt Finlayson, Wellsville, UT (US); Keith A. Taylor, Plain City, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 151 days.

(21) Appl. No.: 15/248,732

(22) Filed: Aug. 26, 2016

(65) Prior Publication Data

US 2017/0056706 A1    Mar. 2, 2017

Related U.S. Application Data

(60) Provisional application No. 62/211,226, filed on Aug. 28, 2015.

(51) Int. Cl.
| | |
|---|---|
| A63B 21/00 | (2006.01) |
| A63B 21/22 | (2006.01) |
| A63B 22/06 | (2006.01) |
| A63B 22/00 | (2006.01) |
| F16F 15/00 | (2006.01) |

(Continued)

(52) U.S. Cl.
CPC .......... *A63B 21/225* (2013.01); *A63B 22/001* (2013.01); *A63B 22/0664* (2013.01); *F16F 15/00* (2013.01); *A63B 21/015* (2013.01); *A63B 22/0023* (2013.01); *A63B 22/0056* (2013.01); *A63B 71/0622* (2013.01); *A63B 2022/067* (2013.01); *A63B 2022/0688* (2013.01); *A63B 2071/0063* (2013.01); *A63B 2071/0625* (2013.01); *A63B 2071/0638* (2013.01); *A63B 2220/18* (2013.01); *A63B 2220/50* (2013.01)

(58) Field of Classification Search
None
See application file for complete search history.

(56) References Cited

U.S. PATENT DOCUMENTS

| 3,738,661 A | * | 6/1973 | Moller ................ A63B 21/015 473/229 |
|---|---|---|---|
| 4,830,362 A | | 5/1989 | Bull |

(Continued)

FOREIGN PATENT DOCUMENTS

| TW | 337201 | 7/1998 |
|---|---|---|
| TW | M322829 | 12/2007 |

(Continued)

OTHER PUBLICATIONS

International Search Report issued for PCT/US2016/049029 dated Nov. 18, 2016.

(Continued)

*Primary Examiner* — Stephen R Crow
(74) *Attorney, Agent, or Firm* — Holland & Hart LLP

(57) ABSTRACT

An exercise machine includes a joint assembly. The joint assembly includes a pivot rod, a first component connected to the pivot rod, a second component connected to the pivot rod, and a bushing mounted on the pivot rod between the first component and the second component. The bushing includes a body with a first side and a second side, the body comprising an elastic, flexible material; a first plate connected to the first side of the body; and a second plate connected to the second side of the body.

20 Claims, 7 Drawing Sheets

(51) Int. Cl.
A63B 71/06 (2006.01)
A63B 21/015 (2006.01)
A63B 71/00 (2006.01)

(56) References Cited

U.S. PATENT DOCUMENTS

| | | | |
|---|---|---|---|
| 5,139,469 A | 8/1992 | Hennessey et al. | |
| 5,244,444 A * | 9/1993 | Wostry | A63B 21/0615 482/109 |
| 5,695,434 A | 12/1997 | Dalebout et al. | |
| 6,835,166 B1 | 12/2004 | Stearns et al. | |
| 7,749,137 B2 * | 7/2010 | Watt | A63B 22/0017 482/52 |
| 7,775,947 B2 * | 8/2010 | Towley, III | A63B 21/075 482/106 |
| 8,167,734 B2 * | 5/2012 | Boldin | A63B 69/365 473/219 |
| 2014/0135180 A1 | 5/2014 | Dalebout | |
| 2017/0056706 A1 * | 3/2017 | Finlayson | A63B 21/225 |

FOREIGN PATENT DOCUMENTS

| | | |
|---|---|---|
| TW | M458484 | 6/2013 |
| TW | M465941 | 11/2013 |

OTHER PUBLICATIONS

English Translation of Taiwan First Office Action and Search Report issued for 105127656 dated Feb. 17, 2017.
English Translation via Orbit.com of the Abstract of TW M454848. Jun. 11, 2013.
English Translation via Orbit.com of the Abstract of TW M322829. Dec. 1, 2007.
English Translation via Orbit.com of the Abstract of TW 337201. Jul. 21, 1998.
English Translation via Orbit.com of the Abstract of TW M465941. Nov. 21, 2013.

* cited by examiner

BUSHING IN AN EXERCISE MACHINE

CROSS-REFERENCE TO RELATED APPLICATIONS

This application claims priority under 35 U.S.C. 119 from U.S. Provisional Patent Application No. 62/211,226, filed on Aug. 28, 2015, entitled HANDLEBAR VIBRATION CONTROL, which application is incorporated herein by reference in its entirety.

BACKGROUND

Aerobic exercise is a popular form of exercise that improves one's cardiovascular health by reducing blood pressure and providing other benefits to the human body. Aerobic exercise generally involves low intensity physical exertion over a long duration of time. Generally, the human body can adequately supply enough oxygen to meet the body's demands at the intensity levels involved with aerobic exercise. Popular forms of aerobic exercise include running, jogging, swimming, and cycling among others activities. In contrast, anaerobic exercise often involves high intensity exercises over a short duration of time. Popular forms of anaerobic exercise include strength training and short distance running.

Many choose to perform aerobic exercises indoors, such as in a gym or their home. Often, a user will use an aerobic exercise machine to have an aerobic workout indoors. One such type of aerobic exercise machine is an elliptical exercise machine, which often includes foot supports that move in fixed reciprocating directions when moved by the feet of a user. Often, the foot supports will be mechanically linked to arm levers that can be held by the user during the workout. The arm levers and foot supports move together and collectively provide resistance against the user's motion during the user's workout. Other popular exercise machines that allow a user to perform aerobic exercises indoors include treadmills, rowing machines, stepper machines, and stationary bikes to name a few.

One type of exercise device is disclosed in U.S. Pat. No. 7,166,067 issued to Roger Talish, et al. (hereinafter the "'067 patent"). In this reference, the term "loading means" includes, without limitation, vibrational loading mechanisms such as linear or rotary loading mechanisms, further linear actuators, rotary actuators, actuators that provide both linear and rotary motions, transducers and the like. The '067 patent, col. 2, lines 17-33. The loading mechanism thereby induces mechanical loading of bodily tissue adjacent to or supported by the support surface sufficient to facilitate the growth, development, strengthening, and/or healing of bone tissue. Id. The loading mechanism may include an actuator or transducer operatively associated with the support surface. Id. The loading mechanism may be associated with a support surface of any exercise device, including standard exercise devices such as rowing machines, stair climbing machines, elliptical trainers, bicycles, cross-country ski trainers, treadmills, Pilates machines, or weight training machines. Id. Further, Talish teaches that rotary loading mechanisms can be incorporated into the pivot points of the swing levers of an elliptical trainer so as to impart mechanical and cyclical loading to the patient's upper appendages and torso via handles. The '067 patent, col. 6, lines 57-67. Rotary loading mechanisms can also be incorporated into the flywheel components or pedal bushings of the elliptical trainer, so as to impart mechanical and cyclical loading to the patient's lower appendages and torso via pedals. Id. A linear loading mechanism can also be incorporated into the base of the elliptical trainer. Id.

SUMMARY

In one embodiment, an exercise machine includes a joint assembly. The joint assembly includes a pivot rod, a first component connected to the pivot rod, a second component connected to the pivot rod, and a bushing mounted on the pivot rod between the first component and the second component. The bushing includes a body with a first side and a second side, the body comprising an elastic, flexible material; a first plate connected to the first side of the body; and a second plate connected to the second side of the body. The bushing is held between the first component and the second component under compression in a direction that is aligned with a length of the pivot rod, and at least one of the first component and the second component is rotatably attached to the pivot rod.

The first component may be an arm assembly of an exercise machine.

The second component may be a frame of an upright structure of the exercise machine.

The second component may be a beam that connects the arm assembly to a foot pedal.

The exercise machine may include a rotary resistance mechanism, and a beam connecting the foot pedal to the rotary resistance mechanism. The joint assembly may be at the junction of the rotary resistance mechanism and the beam.

The exercise machine may include a thru-hole in a center of the bushing, a lip proximate the thru-hole in either the first plate or the second plate, and an interference fit between the lip and the frame when the exercise machine is assembled.

The exercise machine may include one or more apertures in the first plate and the second plate, and the apertures may align the bushing to the frame and the pivot rod.

The first plate and the second plate may include a rigid material.

The first plate and the second plate may include an acetal material.

The body may include a polyurethane.

The body may exhibit a hardness characteristic measuring between Shore 30 A and Shore 50 A.

The body may exhibit a hardness characteristic measuring approximately Shore 40 A.

At least one of the first component and the second component may be rotationally fixed with respect to the pivot rod.

In one embodiment, an exercise machine includes a frame, a pivot rod connected to the frame, an arm support pivotally mounted to the pivot rod, and a bushing mounted on the pivot rod between the arm support and the frame. The bushing includes a body with a first side and a second side, the body comprising an elastic, flexible material; a first plate connected to the first side of the body; and a second plate connected to the second side of the body.

The exercise machine may include a thru-hole in a center of the bushing, a lip proximate the thru-hole in either the first plate or the second plate, and an interference fit between the lip and the frame when the exercise machine is assembled.

The bushing may be compressed between the frame and the arm support.

A compressed region of the bushing may reduce vibrations of the arm support when the arm support is in use.

A compressed region of the bushing may align a pivot connection on the pivot rod.

The exercise machine may include one or more apertures in the first plate and the second plate. The apertures may align the bushing to the frame and the pivot rod.

In one embodiment of the present invention, an exercise machine includes a frame, a resistance mechanism attached to the frame, a crank assembly in mechanical communication with the resistance mechanism, a pedal assembly movably attached to the crank assembly and movable in a performance of an exercise, an arm assembly connected to the frame and movable in the performance of the exercise. The arm assembly includes a pivot rod connected to the frame, an arm support pivotally mounted to the pivot rod, a bushing mounted on the pivot rod and between the arm support and the frame. The bushing includes a circular body with a first side and a second side opposite the first side. The circular body includes an elastic, flexible polyurethane that exhibits a hardness characteristic measuring between Shore 30 A and Shore 50 A. The bushing includes a first rigid circular plate connected to the first side of the circular body and a second rigid circular plate connected to the second side of the circular body a pivot arm.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

Throughout the drawings, identical reference numbers designate similar, but not necessarily identical, elements.

DETAILED DESCRIPTION

Figure 1:
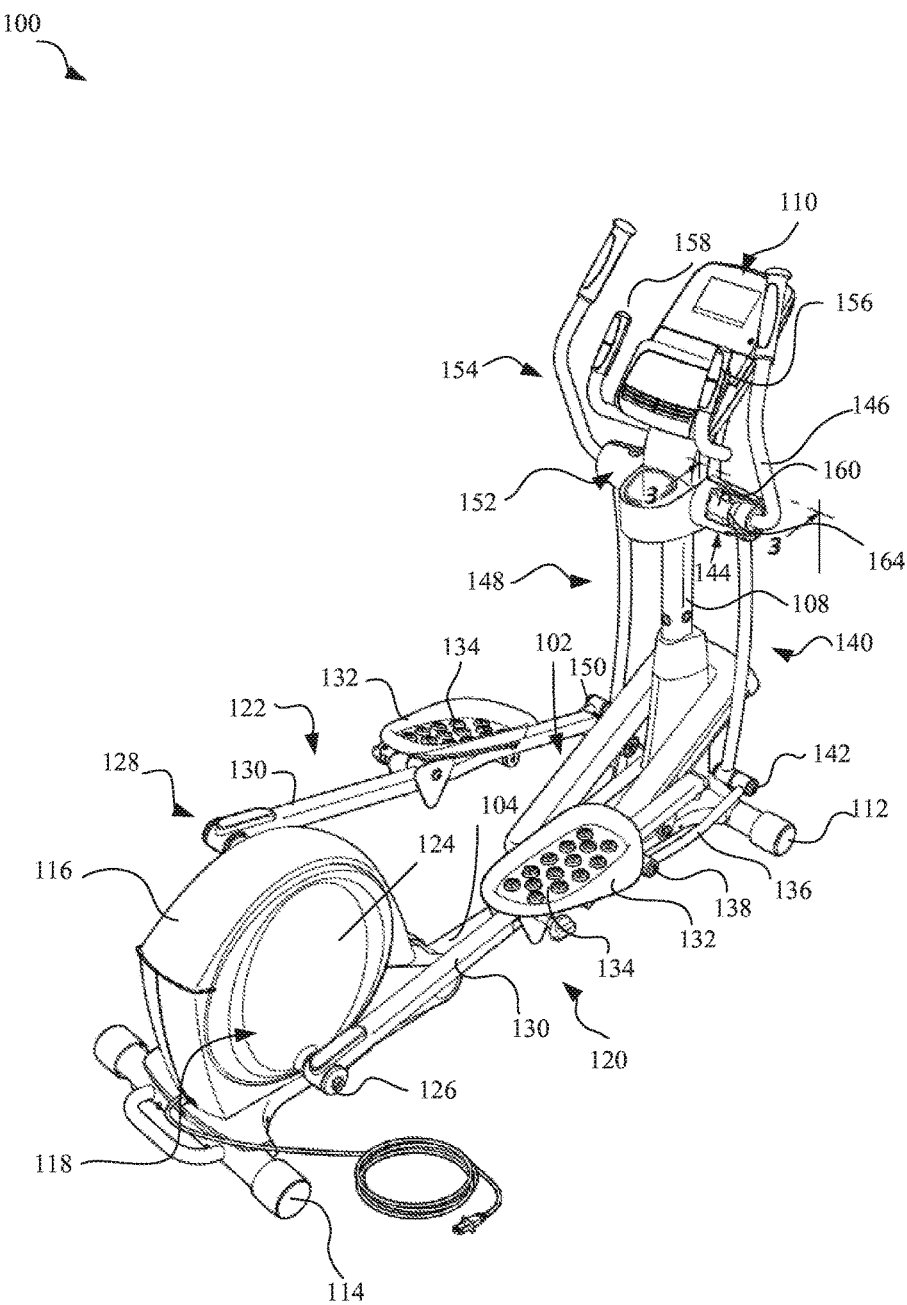
FIG. 1 illustrates a perspective view of an example of an exercise machine in accordance with the present disclosure.

Particularly, with reference to the figures, FIG. 1 depicts an example of an exercise machine 100. The exercise machine 100 includes a frame 102 attached to a base 104. The frame 102 includes a post 108. A console 110 is connected to the post 108. The base 104 has a first support beam 112 and a second support beam 114. The base 104 is connected to a housing 116 which contains a flywheel (not shown) or another type of resistance mechanism. The flywheel is connected to a first crank assembly 118 and a second crank assembly (not shown). The first crank assembly 118 is connected to a first pedal assembly 120 and the second crank assembly is connected to a second pedal assembly 122.

The first crank assembly 118 includes a first crank wheel 124 connected to the first pedal assembly 120 via a first pivot joint 126. In the embodiment shown, the first crank wheel 124 may be integrated into the housing 116. Likewise, the second crank wheel is connected to the second pedal assembly 122 via a second pivot joint 128. The second crank wheel may be integrated into the housing 116 similar to the first crank wheel 124.

Each of the first pedal assembly 120 and the second pedal assembly 122 includes a pedal beam 130, and a pedal 132 connected to the pedal beam 130. The pedal 132 may include a gripping surface 134 to grip a user's shoe as a user executes an exercise with the exercise machine 100. The pedal 132 may be bolted or otherwise fastened to the pedal beam 130.

A first connecting beam 136 is attached to the pedal beam 130 at a first connection joint 138. The first connecting beam 136 is connected a first arm assembly 140 at a first joint 142. The first arm assembly 140 connects to the frame 102 at a first pivot connection 144. The first pivot connection 144 is also attached to a first handle section 146 which is accessible to the user as the user is performing an exercise with the exercise machine 100. The pedal beam 130 of the second pedal assembly 122 is connected to second connecting beam (not shown) at a second connection joint (not shown). The second connecting beam is connected to a second arm assembly 148 at a second joint 150. The second arm assembly 148 connects to the frame 102 at a second pivot connection 152. The second pivot connection 152 is also attached to a second handle section 154 which is also accessible to the user as the user is performing an exercise with the exercise machine 100. As the pedal beams 130 move, the first and second handle sections 146, 154 move accordingly. A user may also use a pair of stationary handles 156, 158 as the user is performing the exercise with the exercise machine. The first pivot connection 144 and second pivot connection 152 connect the first and second arm assemblies 140, 148 to a pivot rod 160 connected to the frame 102. A bushing 164 is located on the pivot rod 160 between the console 110 and the pivot connections 144, 152.

The bushing 164 may be incorporated into the exercise machine in any appropriate joint. For example, a non-limiting list of joints where the bushing may be incorporated into an exercise machine includes joint 126, joint 128, joint 138, joint 142, joint 150, other joints, and combinations thereof.

Figure 2:
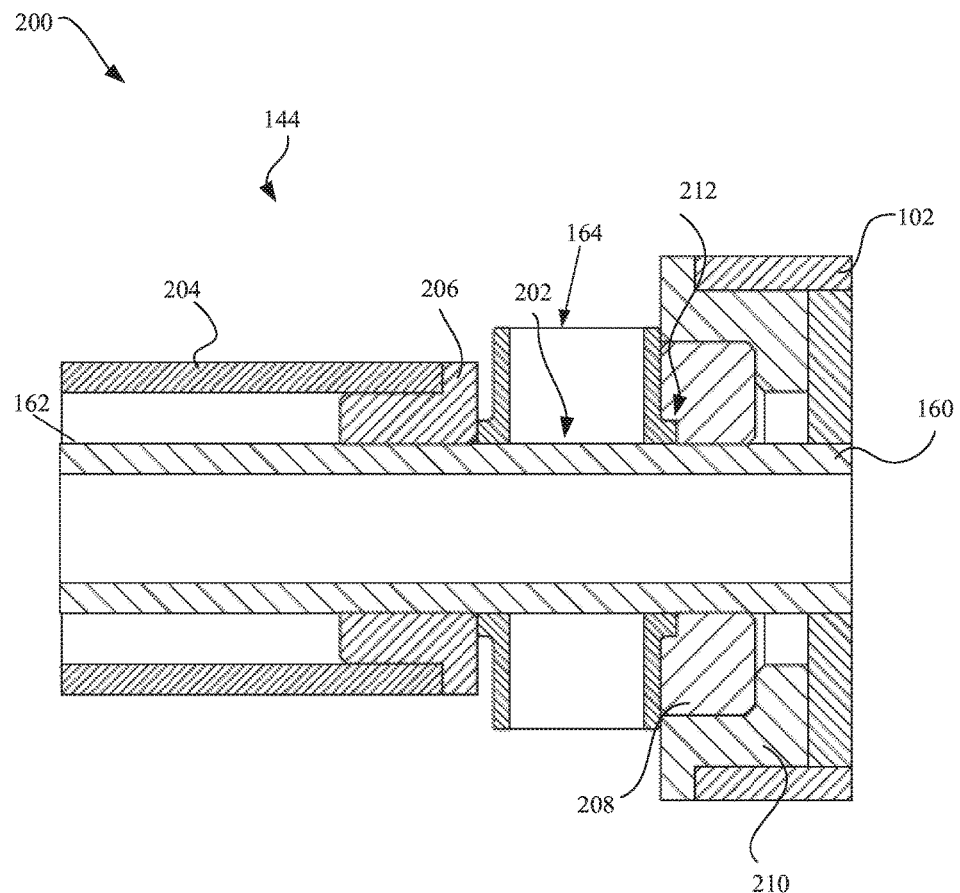
FIG. 2 illustrates a cross-sectional view of an example pivot rod assembly in accordance with the present disclosure.

FIG. 2 is a cross-sectional view of the pivot rod assembly 200 along line A. As shown in FIG. 2, the bushing 164 is mounted on the pivot arm 162. The frame 102 provides a cavity to accept the pivot arm 162. The bushing 164 may be located between the first pivot connection 144 and the frame 102. The first pivot connection 144 includes a sleeve 204 and a pivot spacer 206. The frame 102 includes a first spacer 208 and a second spacer 210. The sleeve 204 and the pivot spacer 206 push the bushing 164 into the first spacer 208 and the second spacer 210 which are pushed into the frame 102. The bushing 164 has an interference fit 212 between the bushing 164 and the first spacer 208.

The bushing 614 may be a loose fit, line on line fit, or a tight fit between a thru-hole 202 of the bushing 164 and an outer diameter of the pivot arm 162. In a loose fit, a diameter of the thru-hole 202 of the bushing 164 is larger than the outer diameter of the pivot arm 163. In a line on line fit, the diameter of the thru-hole 202 is the same as the outer diameter of the pivot arm 163. In a tight fit, the diameter of the thru-hole 202 is smaller than the outer diameter of the pivot arm 163.

In this embodiment, a single pivot arm 162 attaches to the frame 102 and has a symmetrical assembly on the other side of the frame 102 to attach a second pivot connection. In another embodiment, the frame 102 may comprise two pivot arms which may separately connect the frame 102 and their respective pivot connection.

Figure 3:
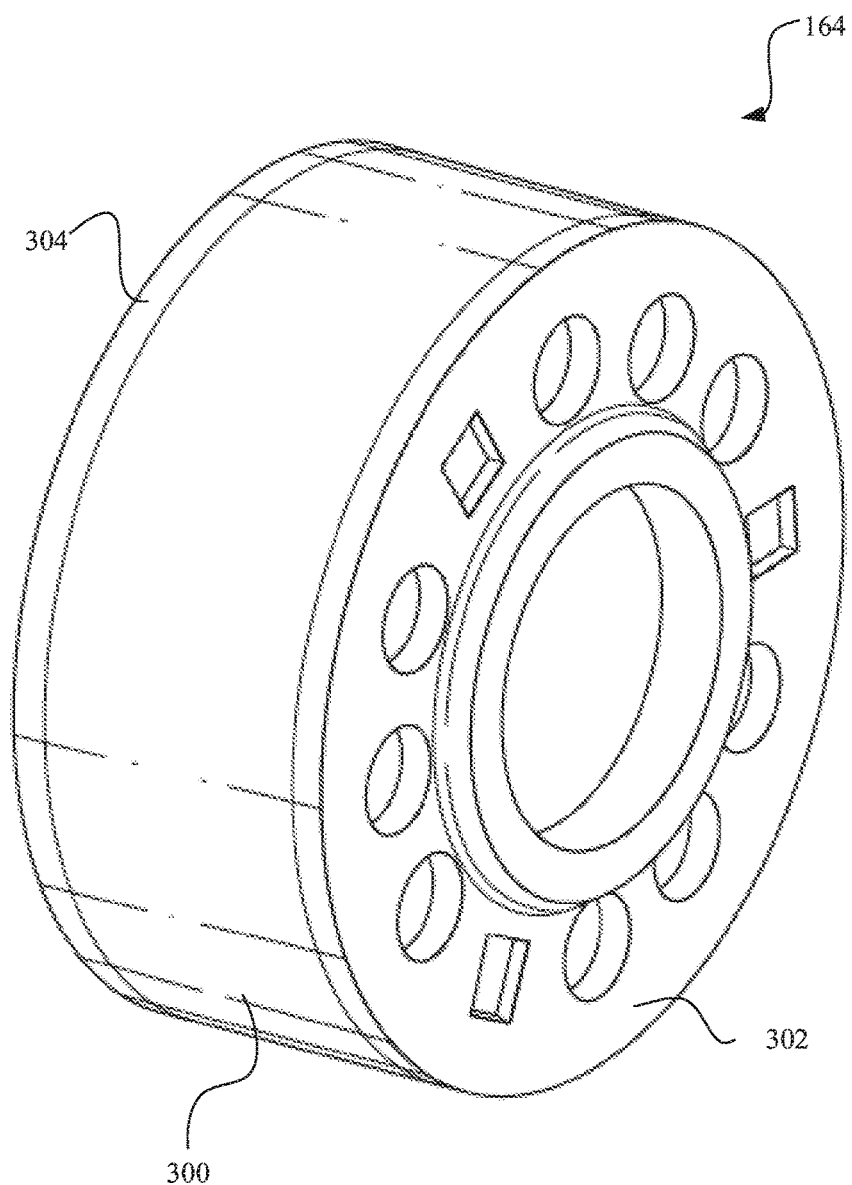
FIG. 3 illustrates a perspective view of an example bushing in accordance with the present disclosure.

FIG. 3 shows an isometric view of an exemplary bushing 164. The bushing 164 includes three parts: a circular body 300, a first circular plate 302, and a second circular plate 304. The first circular plate 302 and second circular plate 304 are connected to the circular body. The first circular plate 302 is connected to a first side of the circular body 300 and the second circular plate 304 is connected to a second side of the circular body 300. The first circular plate 302, circular body 300, and the second circular plate 304 have a common outer diameter.

Figure 4:
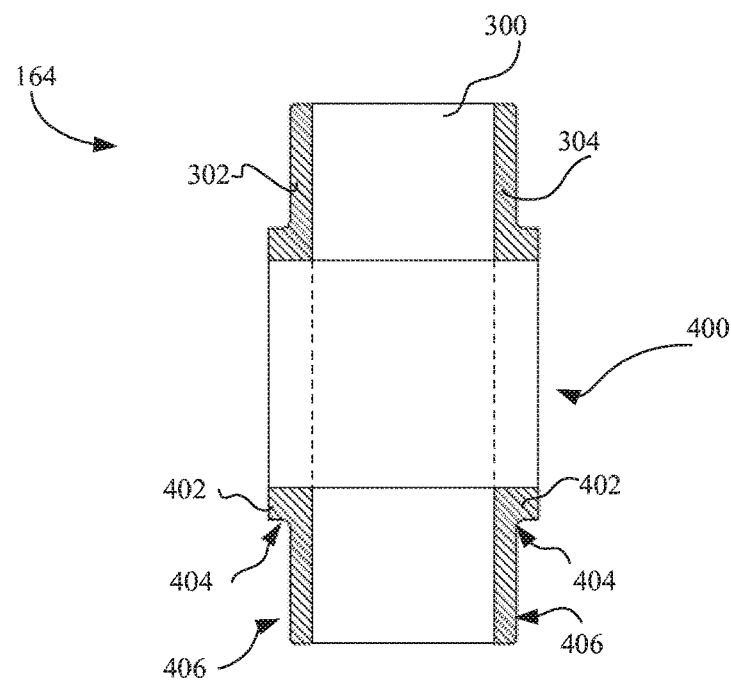
FIG. 4 illustrates a cross-sectional view of an example bushing in accordance with the present disclosure.

As shown in FIG. 4, the bushing 164 has a common thru-hole 400 through the first circular plate 302, circular body 300, and the second circular plate 304. The thru-hole 400 is in substantially the center of the bushing 164. The first and second circular plates 302, 304 may be symmetrical and/or identical. As shown in FIG. 4, the first and second circular plates include a lip 402 and a fillet 404 between the lip and the flat portion 406 of the circular plate 302, 304. The lip 402 is proximate the thru-hole 400 and extends beyond a thickness t of the circular plate 302, 304. The fillet 404 rounds the interior corner between the flat portion 406 and the lip 402.

Figure 5:
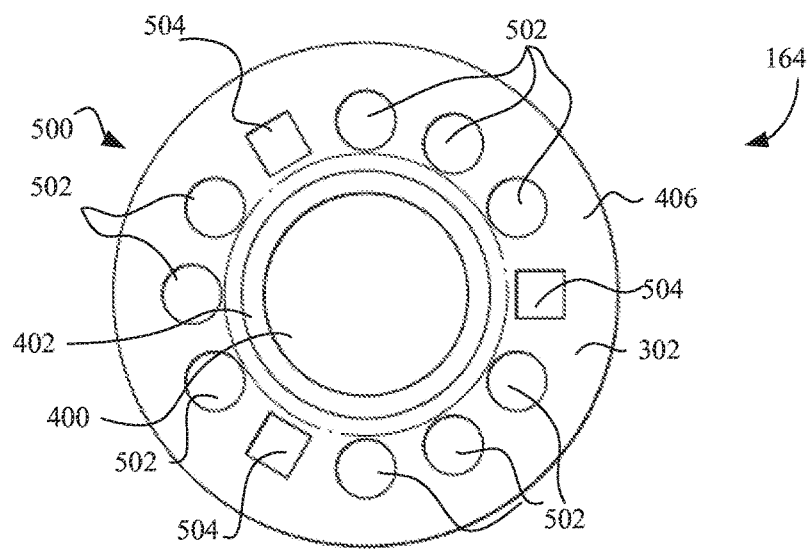
FIG. 5 is a side view of an example bushing in accordance with the present disclosure.

FIG. 5 shows an exemplary side view of the bushing 164. The first circular plate 302 is depicted in the figure. In some examples, the second circular plate 304 is identical to the first plate 302. The side view shows the thru-hole 400, lip 402, and outer diameter 500 of the bushing 164. The side view also shows a variety of apertures 502 in the first circular plate 302. The first series of apertures 502 are circular and form a pattern around the flat portion 406 of the circular plate 302. The apertures 502 are grouped into a series of three apertures 502 and are evenly spaced about a second series of apertures 504. A total of three apertures 504 are square-shaped and evenly distributed about the flat portion 406 of the circular plate 302. The groups of the first series of apertures are spaced in between the series of second apertures 504. Both the first and second series of apertures 502, 504 are located far enough away from the lip to avoid contacting the fillet 404 between the lip 402 and the flat portion 406. The apertures 502, 504 are also located far enough away from the outer diameter 500 to define a complete void in the flat portion.

Figure 6:
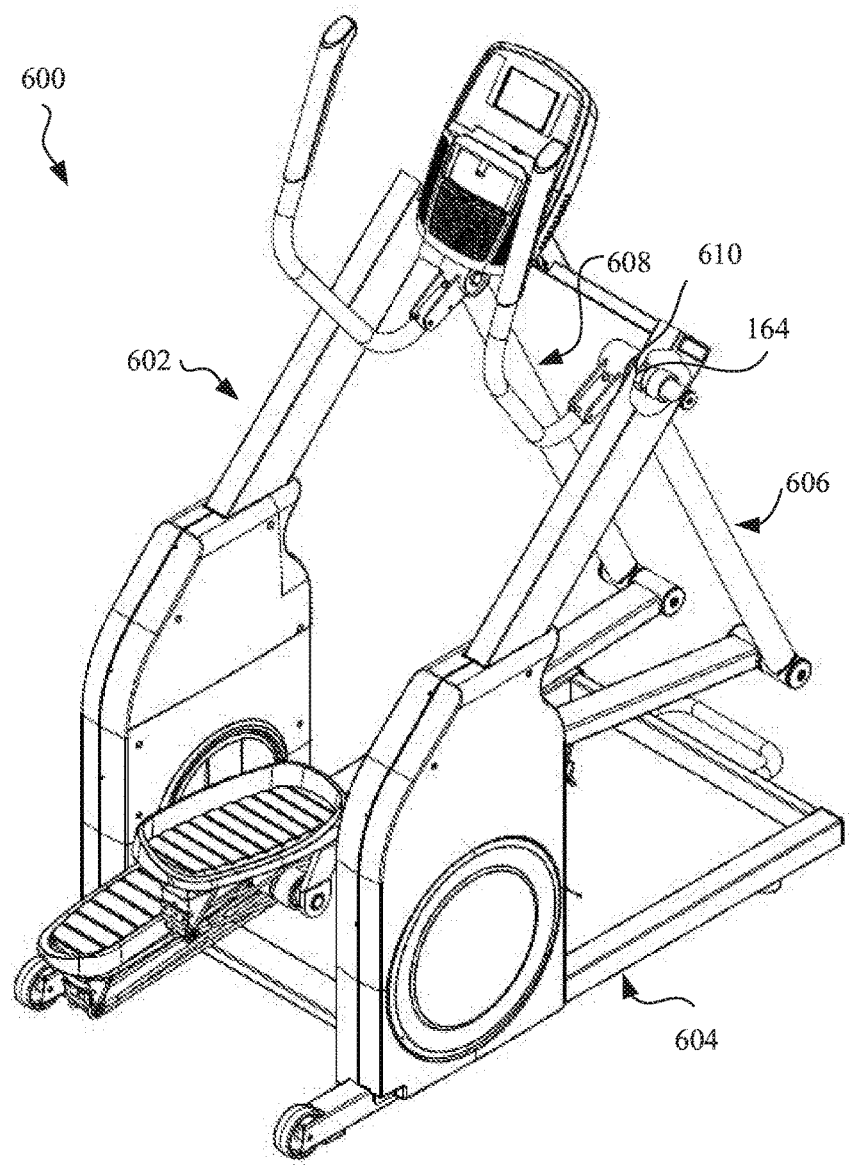
FIG. 6 illustrates a perspective view of another example of an exercise machine in accordance with the present disclosure.

FIG. 6 is another example of an exercise machine 600 that may incorporate the bushing 164. The exercise machine 600 includes a frame 602 with a base 604. The frame 602 has a first arm assembly 606 and a second arm assembly 608 connected to it. The first arm assembly 606 is connected to a first pivot arm 610 which is connected to the frame 602. The bushing 164 is located between the arm assembly 608 and the frame 102. The second arm assembly 608 is connected to a second pivot arm (not shown) which is connected to the frame 602. The bushing 164 may be incorporated into any of the appropriate joints depicted in the exercise machine 600.

Figure 7:
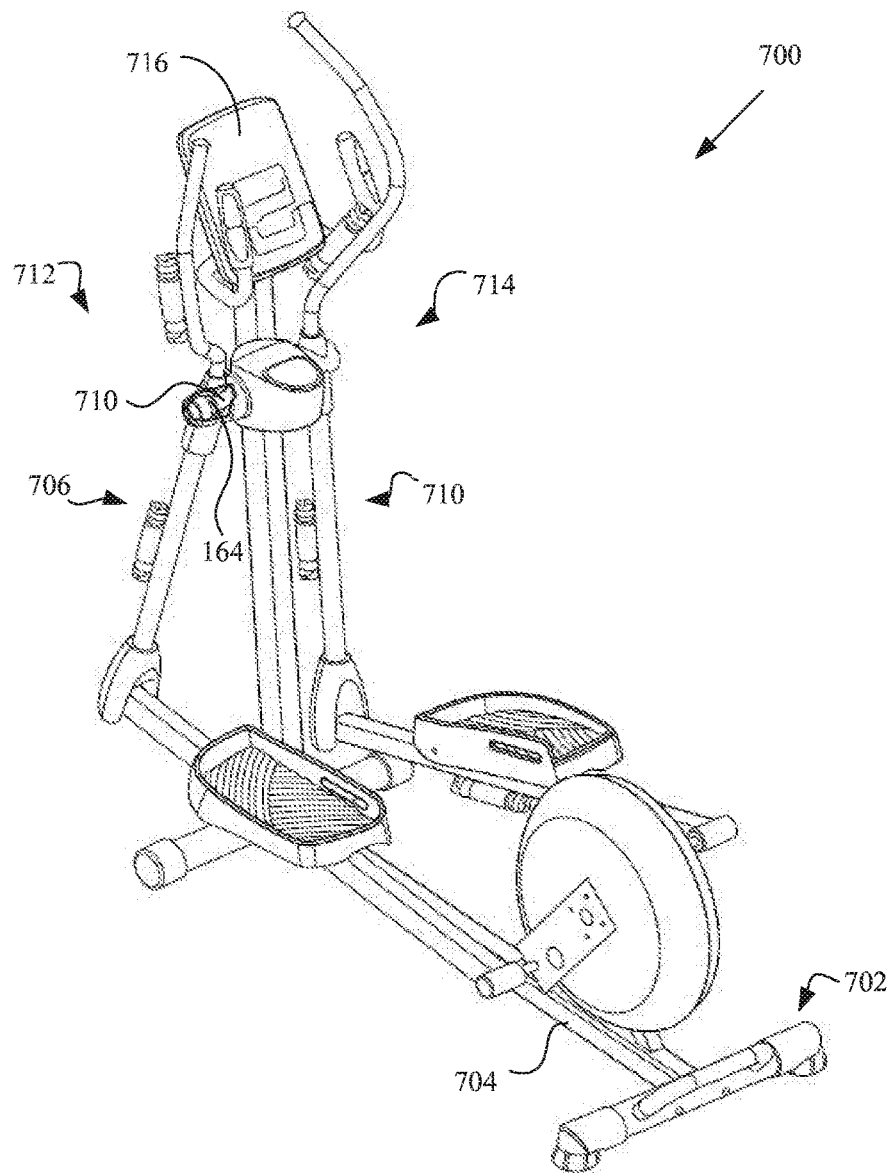
FIG. 7 illustrates a perspective view of another example of an exercise machine in accordance with the present disclosure.

FIG. 7 is another example of an exercise machine 700 that may incorporate the bushing 164. The exercise machine 700 includes a frame 702 with a base 704. The frame 702 has a first arm assembly 706 and a second arm assembly 710 connected to it. The first arm assembly is 706 connected to a pivot arm 712 on a first side 714 of the frame 702. The bushing 164 is located between the first arm assembly 706 and the frame 702. The second arm assembly 710 is connected to the pivot arm (not shown) on a second side 716 of the frame 702. The bushing 164 may be incorporated into any of the appropriate joints depicted in the exercise machine 700.

In this example, a console 716 is attached to the frame 702. The console 716 may contain a display and controls. The controls may allow the user to specify a resistance level to be applied by the resistance mechanism. In some examples, the controls may also be used to control other operating parameters of the exercise machine, such as incline, side to side tilt, resistance, speaker volume, programmed exercise routines, other parameters, or combinations thereof. The display may show selected parameters to the user. Additionally, the display may be capable of presenting the user's physiological parameters, timers, clocks, scenery, routes, other types of information, or combinations thereof.

Figure 8:
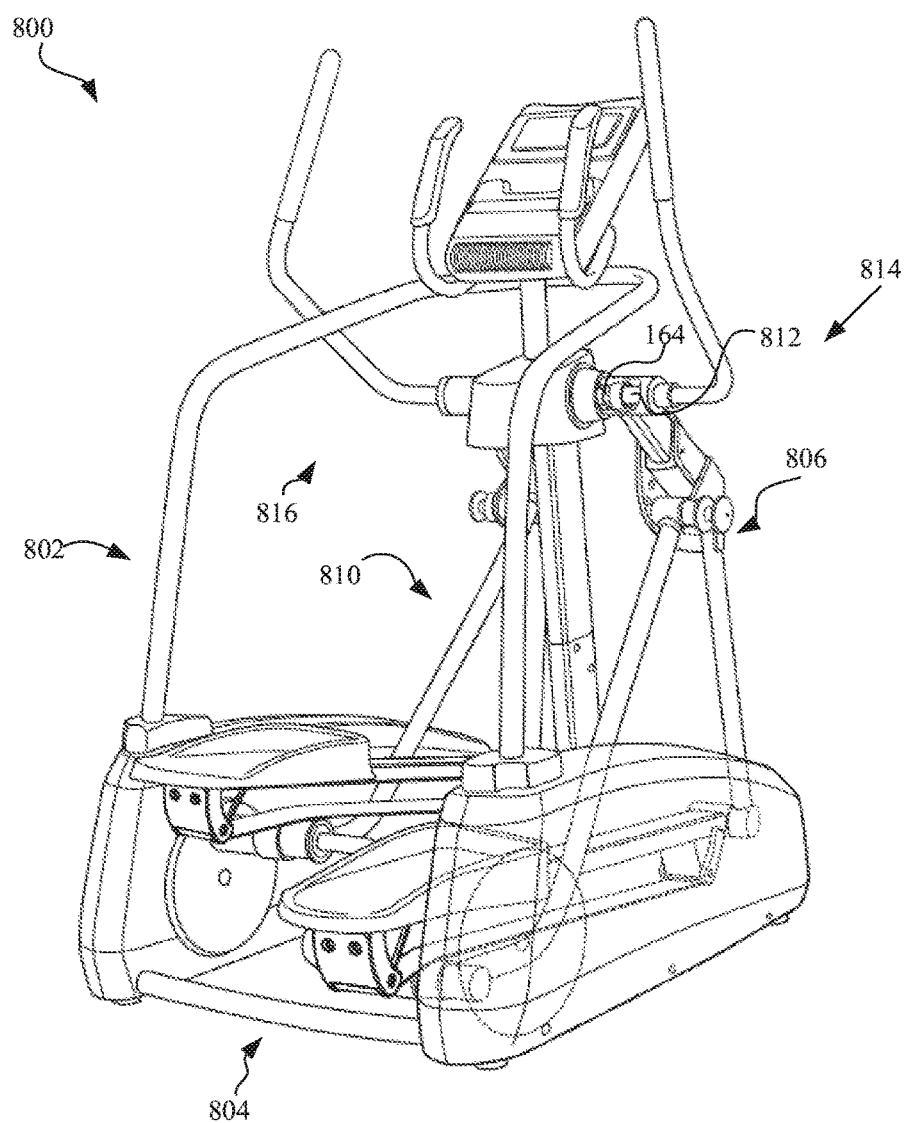
FIG. 8 illustrates a perspective view of another example of an exercise machine in accordance with the present disclosure.

FIG. 8 is another example of an exercise machine 800 that may incorporate the bushing 164. The exercise machine 800 includes a frame 802 with a base 804. The frame 802 has a first arm assembly 806 and a second arm assembly 810 connected to it. The first arm assembly 806 is connected to a pivot arm 812 on a first side 814 of the frame 802. The bushing 164 is located between the first arm assembly 806 and the frame 802. The second arm assembly 810 is connected to the pivot arm (not shown) on a second side 816 of the frame 802. The bushing 164 may be incorporated into any of the appropriate joints depicted in the exercise machine 800.

General Description of the Invention

In general, the systems and methods disclosed herein may provide a user with an exercise machine with a bushing that has long life, that reduces and/or eliminates noise, and that reduces and/or eliminates vibrations in the exercise machine joints. The bushings described herein may replace previous wave washers used in certain joints in exercise machines. These wave washers typically experienced a 30,000 rotation life cycle before they failed. The wave washers also produced a noise and generated vibrations during those 30,000 rotations.

The bushings described in the present disclosure have exhibited a 500,000 or more rotation life cycle. Additionally, the bushing described in the present disclosure has reduced and/or eliminated noise and vibrations at the joints.

The bushing may be disposed around a pivot rod. A first component of the joint and a second component of the joint may also be positioned about the pivot rod with the bushing between the first component and the second component. The bushing may be held in compression between the first component and the second component.

The first component may be any appropriate component of the exercise machine. For example, the first component may be a portion of the frame, an arm assembly, a beam, a portion of a rotary resistance mechanism, a base, an upright structure, a foot pedal beam, another type of component, or combinations thereof. In some examples, the first component is rotationally fixed with respect to the pivot rod. In other examples, the first component is rotationally disposed about the pivot rod.

The second component may be any appropriate component of the exercise machine. For example, the first component may be a portion of the frame, an arm assembly, a beam, a portion of a rotary resistance mechanism, a base, an upright structure, a foot pedal beam, another type of component, or combinations thereof. In some examples, the second component is rotationally fixed with respect to the pivot rod. In other examples, the second component is rotationally disposed about the pivot rod.

The bushing may be located at any appropriate joint of the exercise machine. For example, the bushing may be located in a joint between the frame and an arm assembly, in a joint between an arm assembly and a beam to the foot pedal, in a joint between a beam and rotary resistance mechanism, in a joint between a rotary resistance mechanism and an arm assembly, in a joint between a first beam and a second beam, in a joint between a beam and a crank arm, in a joint between a crank arm and an arm assembly, in another type of joint, or combinations thereof. In some examples, the beam is a linkage that connects moving parts of the exercise machine. In some circumstances, these linkages move with the moving parts during the performance of an exercise.

Bushing material is compressed between different components of the joints. This compressive arrangement prevents the bushing from vibrating at the joint, which also reduces the wear and tear on the joint. Thus, a continuous compressive force on the bushing described herein preserves the life the bushing. The elastic material is sandwiched between circular plates made of a material that is stiffer than the elastic material. The compressive loads from the joint's components are first applied to these stiffer plates. The loads are substantially evenly distributed across the plates' areas so that there is little to no peak loading in the elastic material. With the compressive loads substantially equally distributed throughout the elastic material, the useful life of the elastic materials significantly increases.

The constant compressive load also pre-stresses the elastic material, restricting the distance that the elastic material can stretch during the cycles. As a result, the elastic material experiences less fatigue, creep, and other types of mechanical failures associated with a high volume of cycles. The load is applied to the first side of the bushing through the first plate and to the second plate which is on the opposite side of the bushing from the first plate. In some examples, side loads that are less than 25 pounds have not produced the life increase benefits described herein. Further, side loads that are over 75 pounds have also demonstrated a shorter life span. In some examples, the precompressive side load is between 25 and 75 pounds. In another example, the precompressive side load is 30 to 60 pounds. In yet another example, the precompressive side load is between 35 and 55 pounds. In yet another example, the precompressive side load is between 40 and 50 pounds. In some examples, the elastic material has the characteristic of compressing by 0.5 to 2.5 millimeters when the precompressive side load is applied. In yet another example, the elastic material has the characteristic of compressing by 1.0 to 2.5 millimeters when the precompressive side load is applied. In an additional embodiment, the elastic material has the characteristic of compressing by 1.5 to 2.0 millimeters when the precompressive side load is applied. In one particular example, an elastic material that is precompressed by 1.5 millimeters under a load of 40 to 55 pounds improves the life cycle of the bushing from 30,000 cycles to 500,000 cycles of useful life.

The precompressive load is a baseline load applied to the side of the bushing. During the cycle, the side loads applied to the bushing increase above the baseline load and decrease under the base line load. As the loads increase, the bushing's width is shorten, and when the loads decrease, the bushing's width increase. Since the bushing is already under a pre-compressive load prior to the cycle, the bushing may still be under some compressive load even when the side loads are at a lowest level during the cycle. With the bushing under a compressive load at the lowest point in the cycle, the bushing remains fixed in place. With the joint components and the bushing remaining in contact throughout the entire cycle, no gaps are formed in the joint and a reduction in vibration and noise is achieved.

In some examples, the elastic material's volume compresses at a diminishing rate as the side loads increase. For example, as the elastic material is subjected to a compressive force, the elastic material's molecules are moved closer together. But, as the molecules are brought closer together, the force required to move the molecules even closer together increases. Thus, under the precompressive load, the bushing is much more resistant to compression than the bushing would be when no precompressive load is applied. As a result, the precompression not only prevents the bushing from moving during the cycle, but the precompression actual reduces and/or eliminates the fluctuating widths of the bushing, which reduces and/or eliminates vibrations and noise associated with bushings during the cycles.

The exercise machine may include a frame and a resistance mechanism attached to the frame. A crank assembly may be in mechanical communication with the resistance mechanism. The crank assembly includes a crank arm and a roller connected to the crank arm. The exercise machine also includes a pedal assembly movably attached to the crank assembly and movable in the performance of an exercise. The pedal assembly may include a pedal beam with a foot support attached to the pedal beam. The pedal assembly may be pivotally attached to an arm assembly. Likewise, the arm assembly may be moveably attached to an upper portion of the frame of the exercise machine.

The arm assembly includes an arm support, a handle, and a pivot connection. The pivot connection allows the arm assembly to pivot with respect to the upper portion of the frame of the exercise machine. The pivot connection attaches to a pivot rod which may be attached to the frame. In some embodiments, two arm assemblies may be connected to a single pivot rod. In other embodiments, each arm assembly may connect to a respective pivot rod. For example, the pivot arms may connect to two different portions of the frame. In other examples, where the frame is a single column extending upward from the base, the pivot arm may pass through an accepting feature in the single column frame. Alternatively, the single column frame may accept two pivot arms to prevent motion from being transferred from one arm assembly to another.

As a user is performing the exercise, the user may grip the handle in the arm assembly. For the most part, the user's hand follows the arm supports instead of driving their movement, or if the user's arms drive the arm supports movement, the loads imposed on the arm supports from the user are primarily fore/aft forces. However, in the vertical direction and the lateral direction aligned with the length of the pivot rod, the user does not generally impose a significant force. Thus, vibrations in the arm supports are less restricted in these directions. Conversely, as the user engages the foot pedals, the weight of the user is loaded to the joint which tends to suppress vibrations. Thus, the movement in the arm supports may be more prone to vibrations than joints that carry a significant portion of the user's weight. Consequently, the forces that affect the joints are different depending on whether the joint is a load bearing joint or not.

As the user is driving the foot pedals, the arm assembly may have a tendency to vibrate due to external forces on the arm assembly and not forces induced by the user. The vibrations may be side to side vibrations, a lateral movement in the arm assembly from the direction of the pivot connection. The user may, in some instances, experience oscillating vibrations in the arm assemblies. The vibrations may have one or more sources and may not be desirable in a user experience or to the exercise machine. The bushings described above are specifically constructed for these levels of vibrations. The principles described herein can be applied to the joints included in the pedal assembly, but some modifications may be made to account for the load bearing nature of the joints in the pedal assembly.

The vibrations may be caused by external factors to the exercise machine. For example, the floor, on which the exercise machine rests, may not be completely level which may result in vibrations being transmitted through the assembly of the exercise machine. In another instance, a nearby exercise machine, such as in a gym or other fitness setting, may transmit vibrations into the floor which may transfer into the exercise machine and travel through its structure. As a user is using a nearby exercise machine, the user may be running which may cause surrounding exercise machines to reverberate the motions as it is transferred through a common floor surface.

Vibrations may additionally be caused by sources internal to the exercise machine. Tolerance differentials in different components of the assembly of the exercise machine may cause oscillations or side to side movement of the arm assembly. Additionally, the user may enact forces on the exercise machine when utilizing the machine. The amount of energy transmitted from the user into the exercise machine may depend on height and weight of the user, speed of use, overall grace of the user, and the like. The forces on the exercise machine may transmit to the handles through the foot support connection to the arm assembly. Similarly, the foot support connection to the flywheel may cause vibration-related forces to be transmitted to the frame which may radiate to the arm assemblies. Also, a combination of both may cause arm assembly vibrations.

Another form of vibrations may be side to side play of the arm assembly mentioned above. The side to side play of the arm assembly may be lateral to the pivot motion of the arm assembly. One cause of side to side play may be a tolerance differential as the exercise machine is assembled. When parts are manufactured, the parts have a variation in final sizing usually called a tolerance. Tolerance allowances vary depending on manufacturing capabilities, cost of manufacturing, desired component tolerances, and the like. The arm assembly is part of a loop including the pivot arm, base frame, fly wheel, crank assembly, and foot support. As all of the tolerances of the components in this loop are calculated, the accumulated tolerances may result in the arm assembly not being truly centered for optimal performance. Rather the final mounted location of the arm assembly may be subject to the tolerances of the components. While a tolerance analysis may reduce the effects of the tolerances, tolerances may still have an effect on the final assembly of the exercise machine. As a result, the arm assembly may sway, or move, from side to side. The amount of sway may depend on the actual tolerance variance present in the final assembled exercise machine. The side to side play may range from minimal/unnoticeable by the user to the arm assembly noticeably swaying from side to side.

In some instances, a component in the assembly may reduce noise and vibrations, and, in some instances, reduce side to side sway that may be present in the arm assembly. The reduction in noise and vibrations may be specific to the arm assembly and may result in a lack of transferring vibrations to components in the arm assembly or may result in absorbing vibration energies in the arm assembly and preventing the arm assembly from resonating due to vibrations.

For example, a bushing may work to reduce vibrations and reduce tolerance factors in the swaying of the arm assembly. The bushing may comprise an assembly of a circular body with two circular plates connected to each side of the circular body. The circular body of the bushing may comprise an elastic, flexible material. The material may be polyurethane, foam, flexible polyvinyl chloride (PVC), rubber, thermoplastic elastomer, thermoplastic rubber, and the like. The material may exhibit a hardness characteristic between Shore 30 A and Shore 50 A. This range on the durometer scale may provide an extra soft to soft hardness according to a durometer reading. The relative softness of the material may increase the flexibility and compressibility of the material. In tandem, the material may have sufficient relative hardness to provide counter active forces to prevent the bushing from collapsing under increased pressure or strain. The durometer reading may additionally reflect a level of elasticity of the material in its ability to conform to shapes and maintain a solid form when not installed in a usage case. The elasticity may provide for manufacturing repeatability. In other embodiments, the material may exhibit a hardness characteristic of Shore 40 A.

A Shore Hardness scale may be used for measuring the hardness of different materials. A Shore Hardness gauge may outwardly resemble a tire gauge. The Shore Hardness gauge may include a needle on a spring protruding from one end. To measure the hardness, the needle is placed against the material and pressure is applied. Once the gauge is firmly pressed against the material and the needle has reached a maximum penetration, the measurement needle indicates the corresponding hardness measurement.

The circular plates may be a rigid material and may include acetal, steel, aluminum, acrylonitrile butadiene styrene, rigid PVC, nylon, and the like. While this example has been described with reference to a circular body and/or circular plates, the shapes of the body and plates may be any appropriate geometry. For example, the plates and/or the body may include a generally square geometry, a generally triangular geometry, a generally elliptical geometry, a generally polygonal geometry, an asymmetric geometry, or combinations thereof.

The bushing may be located on the pivot arm between the arm assembly and the frame. The arm assembly may include a pivot connection which may pivotally connect the arm assembly to the pivot rod and frame. The pivot connection may include components which mate to the bushing including flat washers, spacers, and the like that may comprise multiple materials. The bushing may mate with one of these components. Additionally, the bushing may mate on an opposing side with a portion of the frame or with one or more components which may interface between the frame and the bushing. The bushing may comprise one or more apertures in the two circular plates. The apertures may align the bushing to the frame and/or the pivot rod. In some embodiments, multiple apertures in the two circular plates may additionally provide compression relief to the circular body as the bushing is compressed between the arm assembly and the frame as described below. Alternatively, the apertures may change the compression and torsional properties of the bushing, while eliminating weight.

When the arm assembly is mounted on the pivot arm, the arm assembly may compress the bushing between the frame and arm assembly. The bushing may compress due to the circular body being an elastic, flexible material. The two circular plates may aid in the compression of the bushing. The compressing of the bushing may cause an interference fit between the bushing and the frame or components there between, the bushing and the arm assembly, or both.

The compression may ensure the bushing is flush against the arm assembly. Due to the flushness of the contact between the arm assembly and the bushing, any vibrations oscillating in the frame may be absorbed by the elastic, flexible material of the bushing and may not transfer to the arm assembly. The two circular plates may ensure the compression is uniform on the flexible material of the body of the bushing. Likewise, the bushing may act as a damper on the arm assembly and absorb vibration energy transmitted into the arm assembly. The bushing may absorb the vibration and attenuate the vibrations into the exercise machine and/or into the arm assembly.

The compressibility of the bushing may also allow for any tolerance gaps that present themselves when assembling the exercise machine. As mentioned above, all components have tolerances which may present themselves at assembly in undesirable outcomes, such as noticeable side to side movement of the arm assembly. The elasticity and flexibility of the bushing may allow the arm assembly to be mounted on the pivot arm and compress the bushing. The bushing may vitiate, or reduce, any effects tolerance gaps have on the centering of the arm assembly. Instead, the bushing may allow the arm assembly to be aligned properly with respect to the pedal assembly and the pivot arm.

In some embodiments, a single bushing may be used between the arm support and the frame. In other embodiments, multiple bushings may be used between the arm support and the frame. The bushings may be mounted consecutively or may be separated by a spacer or washer. The bushings may additionally vary in thickness of the circular body and the circular plates to customize for different types of exercise machines and uses.

An added benefit to using the bushing described herein is the reduction in parts. The bushing is a single component assembly which may be installed as such onto the exercise machine. A single component assembly may reduce complexity in part count of the exercise machine, reduce overhead in ordering hardware for the exercise machine, and reduce general complexity of tracking the component. However, the bushing may be installed in three separate pieces and still serve the same functionality. For example, a first circular plate may be installed, followed by the circular body, and then the second circular plate. While the integrated assembly of the bushing may aid in reduction of parts and installation as mentioned, each piece of the bushing may have its own functionality and purpose. The plates provide a stable and structured surface for the flexible body to align against and with. The plates may also provide a consistent interface between the flexible body and interfacing components. For example, if the flexible body was installed without the plates, the flexible body may conform to surface irregularities on interfacing components and may not provide a steady and consistent pressure between the two parts contacting interface. Conversely, the rigid plate located between an interfacing component and the flexible body provides a consistent surface for mutual compression between the components. Similarly, installing the plates with the flexible body may not achieve the affects described herein. The plates may not be flexible enough to allow for vibration control, potential part tolerance issues, and the like.

While the examples above have been described with a specific number of bushings, any appropriate number of bushings may be used in accordance to the disclosure. For example, the exercise machine may incorporate a single bushing, two bushings, more than two bushings, an even number of bushings, an odd number of bushings, or combinations thereof.

Additionally, while some examples have been described with a single pivot arm, multiple pivot arms may be used in accordance with this disclosure.

What is claimed is:

1. An exercise machine, comprising:
   a joint assembly, the joint assembly including;
      a pivot rod;
      a first component connected to the pivot rod;
      a second component connected to the pivot rod; and
      a bushing mounted on the pivot rod between the first component and the second component;
      the bushing including:
         a body with a first side and a second side, the body including an elastic, flexible material;
         a first plate connected to the first side of the body; and
         a second plate connected to the second side of the body;
   wherein the bushing is held between the first component and the second component under compression in a direction that is aligned with a length of the pivot rod; and
   wherein at least one of the first component and the second component is rotatably attached to the pivot rod.

2. The exercise machine of claim 1, wherein the first component is an arm assembly of an exercise machine.

3. The exercise machine of claim 2, wherein the second component is a frame of an upright structure of the exercise machine.

4. The exercise machine of claim 2, wherein the second component is a beam that connects the arm assembly to a foot pedal.

5. The exercise machine of claim 1, further comprising:
   a rotary resistance mechanism; and
   a beam connecting the foot pedal to the rotary resistance mechanism;
   wherein the joint assembly is at the junction of the rotary resistance mechanism and the beam.

6. The exercise machine of claim 1, further comprising:
   a thru-hole defined in a center of the bushing;
   a lip proximate the thru-hole in either the first plate or the second plate; and
   an interference fit between the lip and the frame when the exercise machine is assembled.

7. The exercise machine of claim 1, further comprising:
   one or more apertures in each of the first plate and the second plate;
   wherein the apertures align the bushing to the frame and the pivot rod.

8. The exercise machine of claim 1, wherein the first plate and the second plate comprise a rigid material.

9. The exercise machine of claim 1, wherein the first plate and the second plate comprise an acetal material.

10. The exercise machine of claim 1, wherein the body comprises a polyurethane.

11. The exercise machine of claim 1, wherein the body exhibits a hardness characteristic measuring between Shore 30 A and Shore 50 A.

12. The exercise machine of claim 11, wherein the body exhibits a hardness characteristic measuring approximately Shore 40 A.

13. The exercise machine of claim 1, wherein at least one of the first component and the second component is rotationally fixed with respect to the pivot rod.

14. An exercise machine, comprising:
a frame;
a pivot rod connected to the frame;
an arm support pivotally mounted to the pivot rod;
a bushing mounted on the pivot rod between the arm support and the frame;
wherein the bushing includes:
  a body with a first side and a second side, the body comprising an elastic, flexible material;
  a first plate connected to the first side of the body; and
  a second plate connected to the second side of the body.

15. The exercise machine of claim 1, further comprising:
a thru-hole in a center of the bushing;
a lip proximate the thru-hole in either the first plate or the second plate; and
an interference fit between the lip and the frame when the exercise machine is assembled.

16. The exercise machine of claim 1, wherein the bushing is compressed between the frame and the arm support.

17. The exercise machine of claim 3, wherein a compressed region of the bushing reduces vibrations of the arm support when the arm support is in use.

18. The exercise machine of claim 3, wherein a compressed region of the bushing aligns a pivot connection on the pivot rod.

19. The exercise machine of claim 1, further comprising one or more apertures in the first plate and the second plate, wherein the apertures align the bushing to the frame and the pivot rod.

20. An exercise machine, comprising:
a frame;
a resistance mechanism attached to the frame;
a crank assembly in mechanical communication with the resistance mechanism;
a pedal assembly movably attached to the crank assembly and movable in a performance of an exercise;
an arm assembly connected to the frame and movable in the performance of the exercise;
the arm assembly comprising:
  a pivot rod connected to the frame;
  an arm support pivotally mounted to the pivot rod;
  a bushing mounted on the pivot rod and between the arm support and the frame,
wherein the bushing comprises:
  a circular body with a first side and a second side opposite the first side, wherein the circular body comprises an elastic, flexible polyurethane that exhibits a hardness characteristic measuring between Shore 30 A and Shore 50 A;
  a first rigid circular plate connected to the first side of the circular body; and
a second rigid circular plate connected to the second side of the circular body a pivot arm.

* * * * *